US012568187B2

(12) United States Patent
Murata

(10) Patent No.: US 12,568,187 B2
(45) Date of Patent: Mar. 3, 2026

(54) SYSTEM AND METHOD FOR AUGMENTED VIEWS IN AN ONLINE MEETING

(71) Applicant: CANON U.S.A., INC., Melville, NY (US)

(72) Inventor: Shingo Murata, Mineola, NY (US)

(73) Assignee: Canon U.S.A., Inc., Melville, NY (US)

( * ) Notice: Subject to any disclaimer, the term of this patent is extended or adjusted under 35 U.S.C. 154(b) by 229 days.

(21) Appl. No.: 18/268,905

(22) PCT Filed: Dec. 22, 2021

(86) PCT No.: PCT/US2021/064859
§ 371 (c)(1),
(2) Date: Jun. 21, 2023

(87) PCT Pub. No.: WO2022/140539
PCT Pub. Date: Jun. 30, 2022

(65) Prior Publication Data
US 2024/0064271 A1 Feb. 22, 2024

Related U.S. Application Data

(60) Provisional application No. 63/130,192, filed on Dec. 23, 2020, provisional application No. 63/153,064, filed on Feb. 24, 2021.

(51) Int. Cl.
*H04N 7/15* (2006.01)
(52) U.S. Cl.
CPC ............. *H04N 7/152* (2013.01); *H04N 7/155* (2013.01)

(58) Field of Classification Search
CPC ............................... H04N 7/152; H04N 7/155
See application file for complete search history.

(56) References Cited

U.S. PATENT DOCUMENTS

| | | | | |
|---|---|---|---|---|
| 2004/0254982 A1* | 12/2004 | Hoffman | ................. | H04L 67/75 |
| | | | | 709/204 |
| 2016/0057391 A1* | 2/2016 | Block | ................. | H04L 12/1822 |
| | | | | 348/14.07 |
| 2018/0165520 A1 | 6/2018 | Meisser et al. | | |
| 2019/0190908 A1* | 6/2019 | Shen | .................... | G06F 16/955 |
| 2019/0215464 A1 | 7/2019 | Kumar et al. | | |

FOREIGN PATENT DOCUMENTS

| | | |
|---|---|---|
| JP | 2019-219889 A | 12/2019 |
| JP | 2020-535688 A | 12/2020 |

* cited by examiner

*Primary Examiner* — Amal S Zenati
(74) *Attorney, Agent, or Firm* — Canon U.S.A., Inc., IP Division

(57) ABSTRACT

A server is provided for a remote meeting conducted between a plurality of clients connected via a network. The server includes one or more memories storing instructions that, when executed, configures the one or more processors, to store, in one or more memories, user id information of a client participating to the remote meeting and a video of the client, associated with each other; store, in one or more memories, a video captured by a predetermined camera and virtual user id information, associated with each other; and transmit, to a client participating to the remote meeting, the video associated with the user id information and the video associated with the virtual user id information.

14 Claims, 12 Drawing Sheets

502

504

Area of object. Clickable.

Sub-window (Virtual) Participant B's streaming video.

Object Zoom-in

402

404

User Information

User Information

User Information

User Information

400

SYSTEM AND METHOD FOR AUGMENTED VIEWS IN AN ONLINE MEETING

CROSS-REFERENCE TO RELATED APPLICATIONS

This application claims the benefit of U.S. Provisional Application Ser. No. 63/130,192 filed on Dec. 23, 2020 and U.S. Provisional Application Ser. No. 63/153,064 filed on Feb. 24, 2021, both of which are incorporated herein by reference in their entirety.

BACKGROUND

Field

The present disclosure relates generally to bidirectional audio visual communication over a communication network.

Description of Related Art

Online meetings between users is known including when a group of individuals at one location are communicating remotely with one or more individuals not presently located at the one location. Current online meeting solutions provide one view per one person or one view from a particular camera. In the case of an online meeting between individuals at an office in a particular meeting room and remote users (e.g. users at home), remote users can see only fixed view of the office space. A system and method according to the present disclosure remedies the drawbacks associated with current online meeting solutions to improve collaboration between users in a meeting room and those who are joining the meeting online and are remotely located.

SUMMARY

According to an aspect of the disclosure a server is provided for a remote meeting conducted between a plurality of clients connected via a network. The server includes one or more memories storing instructions that, when executed, configures the one or more processors, to store, in one or more memories, user id information of a client participating to the remote meeting and a video of the client, associated with each other; store, in one or more memories, a video captured by a predetermined camera and virtual user id information, associated with each other; and transmit, to a client participating to the remote meeting, the video associated with the user id information and the video associated with the virtual user id information.

According to one embodiment, the predetermined camera is a network camera placed at a meeting space. In another embodiment, the video of the client is a video captured by a web camera connected or implemented into a computer of the client.

In another embodiment, the one or more processors are further configured to specify, from the video captured by the predetermined camera, a partial region of at least one of a white board, a display screen and a document, and wherein each partial region is associated with a different virtual user id information. In another embodiment, the server receives a request for a video of a partial region from the client, and the video of the partial region is transmitted to the client in response to the video request.

In another embodiment, the video associated with the user id information and the video associated with the virtual user id information are transmitted to a client reproducing a video of a remote meeting after termination of the remote meeting. Each user id information of the plurality of clients is stored in the one or more memories in associated with security level information, and wherein the video associated with the virtual user id information is transmitted to a client associated with a predetermined security level information and each virtual user id information corresponding to each partial region among the video captured by the predetermined camera is stored in the one or more memories in associated with a security level information, and wherein a video of a partial region to be transmitted to the client is determined based on the security level information associated with the user id information of the client and the security level information associated with each of the virtual user id information.

According to another embodiment the video is transmitted to the client such that the video associated with the user id information and the video associated with the virtual id user information are displayed on a different window.

In another embodiment, a client for a remote meeting conducted between a plurality of clients connected via a network is provided. The client includes one or more processors; and one or more memories storing instructions that, when executed, configures the one or more processors, to receive a video of each client; display, on a first window, the received video of each client, and display a second window in response to an indication of a predetermined button on the first window, wherein the second window displays a video captured by a predetermined camera.

In another embodiment, the second window further displays a video of a partial region, among a video captured by the predetermined camera, of at least one of a white board, a display screen and a document.

In a further embodiment, the one or more processor are further configured to transmit, to a server, meeting ID information in response to a participation button for the remote meeting, and in response to the designation of the predetermined button on the first window, transmit, to the server, a video request including the meeting ID information and requesting a video captured by the predetermined camera, and wherein the second window displays the video received from the server after transmitting the video request.

In another embodiment, the one or more processors are further configured to receive position information indicating a position of the partial region of the video captured by the predetermined camera and detect a designation, by a user, of the partial region whose position is indicated by the position information, wherein an enlarged video of the partial region is displayed in response to the detection of the designation of the partial region.

These and other objects, features, and advantages of the present disclosure will become apparent upon reading the following detailed description of exemplary embodiments of the present disclosure, when taken in conjunction with the appended drawings, and provided claims.

Figure 1:
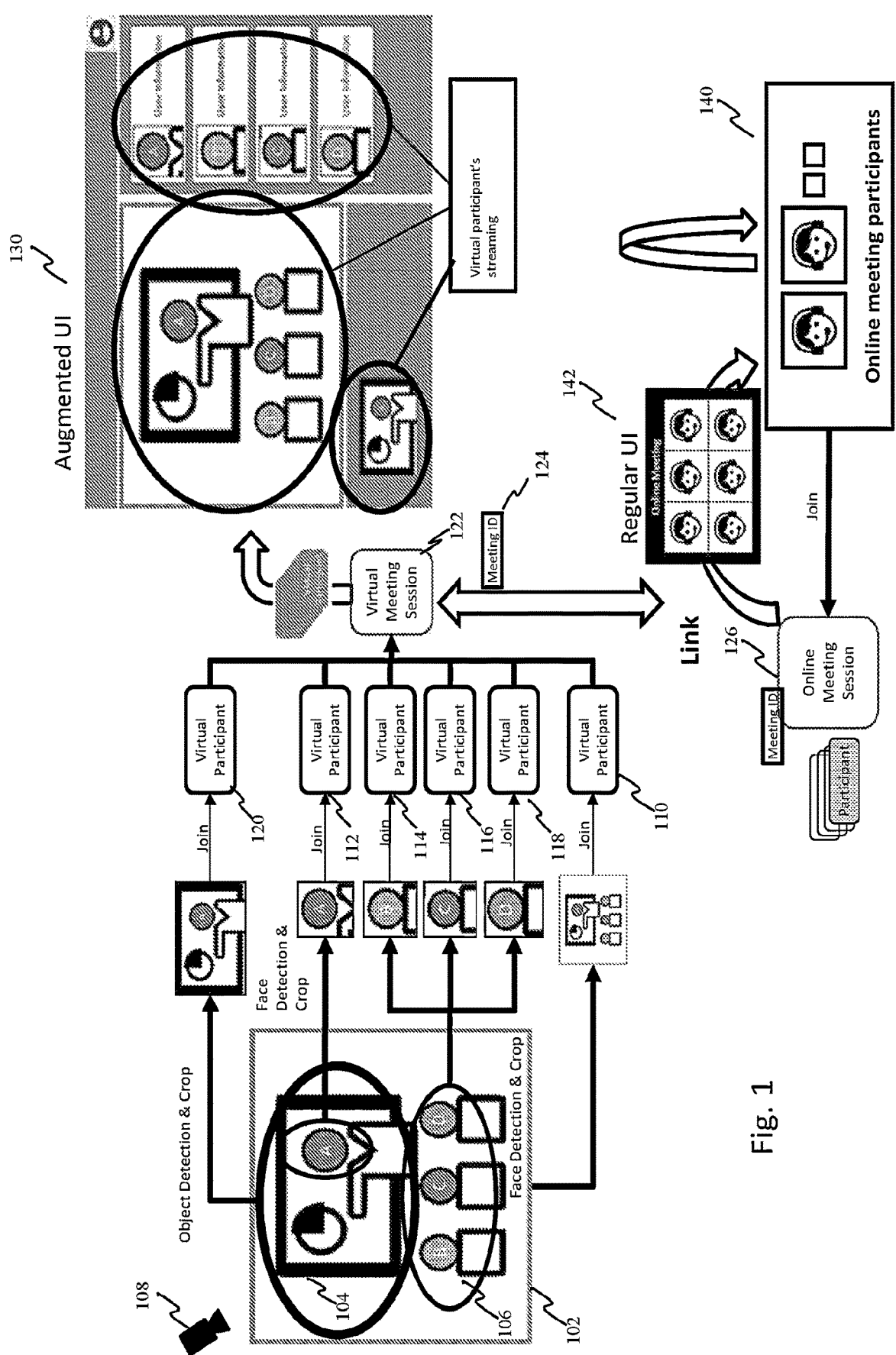
FIG. 1 is an illustrative view of an online meeting solution according to the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

In real-time communication environment such as an online meeting, the online meeting application needs to reduce data traffic. As a result streaming video data from online meeting system sometimes provides video data at a lower image quality. In the case of the meeting between individuals at one location such as a meeting room in an office space and one or more remote individuals (e.g. users at home), those individuals who are remote users can see only zoom-out view or zoom-in view which focuses on one object. Further, current online meeting applications are typically one-way distribution from a source to those remote users that are not at the source from where the video stream is being captured. It is difficult to change the streaming video according to a participant's operation which means that the remote participants are forced to see a predefined view of an image capture device and participants are not able to focus on what they want to see at the location from where the video stream is being captures. For these reasons, the meeting participants (remote users) are not able to see what they want to look at.

The following disclosure illustrates an online meeting application that enables impromptu collaboration between users who may be physically located at one location such as an office and one or more individuals who are remotely located. The system advantageously assigns, manages and uses different identifiers in order to facilitate communication in this environment that allows remote users to have enhanced control over the field of view captured at the one location by an image capture device. As such, the remote user is able to view the one location according to the remote user definition or selection. This is accomplished by assigning user id information (virtual participant ID/Virtual Webcam ID) to each of a video captured by a camera at a meeting space and one or more cropped videos cropped from the captured video to enable an online meeting system to distribute these videos as well as videos of real participants.

According to the present disclosure as shown in FIG. 1, an online meeting application executing on a server (FIG. 2) performs recognition processing to identify one or more different types of objects and one or more different users within an image stream captured by a single image capture device such as a camera. The one or more different types of objects includes but is not limited to a whiteboard, a person, a document, a notebook. In other embodiments, the object detection can automatically detect any object that includes handwriting or typed content, one or more images, a display of a computing device (e.g. laptop, tablet, smartphone, etc.). The recognition processing can further include executing a face detection algorithm that identifies one or more users within an image capture area.

As shown in FIG. 1, an image capture area 102 is shown that includes one or more objects 104 and one or more people 106 that are selectively captured by an image capture device 108. As noted above the one or more objects include a writing surface such as a whiteboard. Additionally, as will be described later, the one or more objects is any object that is not a human user that is positioned within the image capture area. The users 106 are denoted in FIG. 1 as User A, User B, User C and User D but this is not limiting. Any number of users 106 may be present within the image capture area 102.

In one embodiment, recognition processing occurs prior to the meeting and once the one or more objects within the captured video streams are identified, those objects are cropped before streaming video data from camera to online meeting system. In another embodiment, a meeting can be initiated and recognition processing is continually performed based on newly detected presence of users and objects that enter and/or exit the image capture area.

Figure 2:
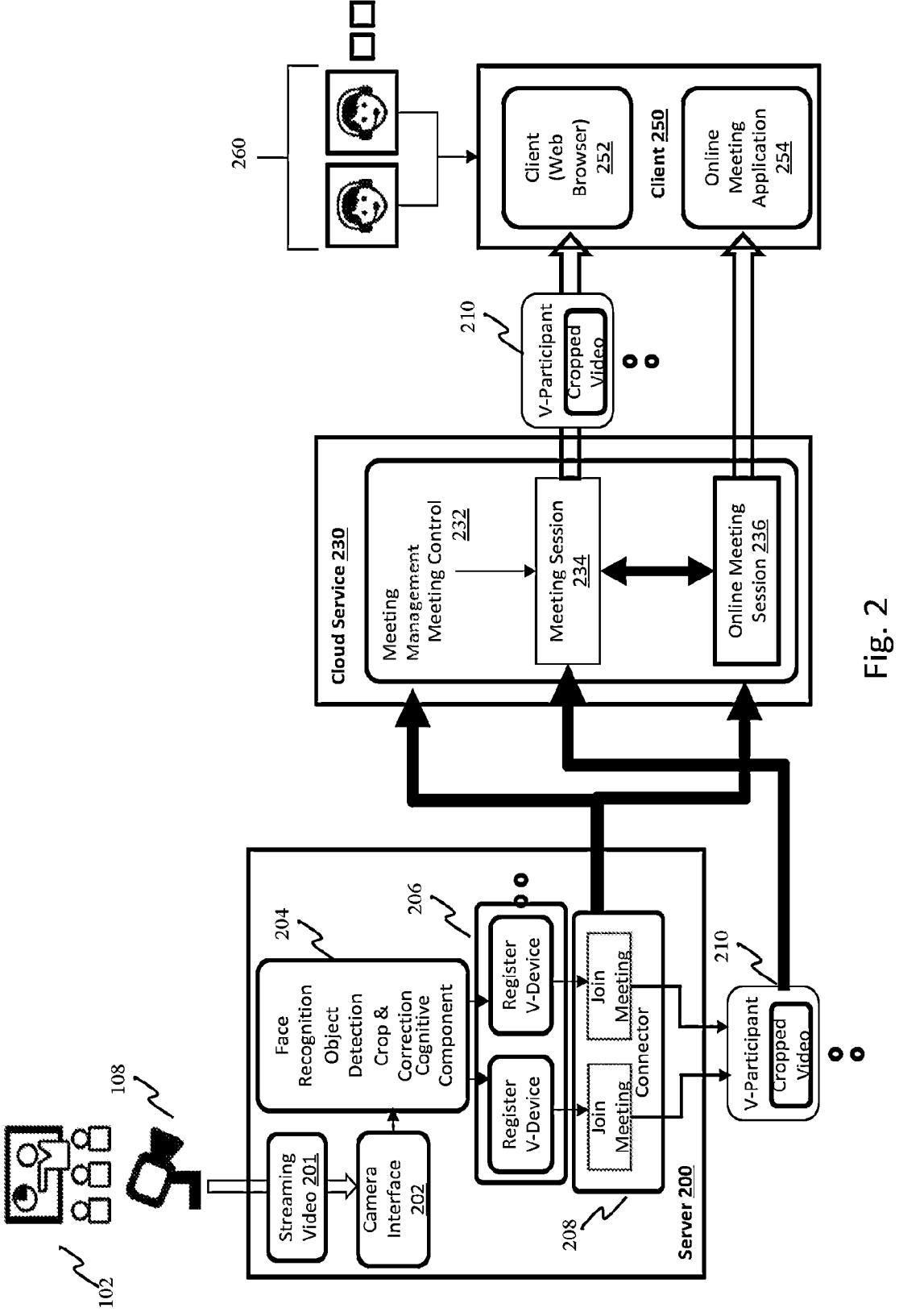
FIG. 2 is a block diagram of an online meeting solution according to the present disclosure.

The meeting application executing on the server in FIG. 2, perform video image cropping operations to crop predetermined regions based on the results of the recognition processing within the video data being captured by the image capture device 108. These cropped regions are extracted by the meeting application executing on a server and controlled to be a source for individual virtual participant streams as shown in FIG. 1. Accordingly the cropped streaming video regions created by the meeting application represent respective virtual video feeds that are provided as inputs to feed and transmit the individual cropped video streams to online meeting system.

The online meeting application obtains these virtual video feeds (e.g. virtual webcams) and causes the individual virtual video to join online meeting as virtual participants.

As shown in FIG. 1, the image capture device 108 performed recognition processing and has identified six regions within the capture area representing either users or objects that were recognized during performance of recognition processing and which are cropped from the frame representing the image capture area 102 into individual regions each of which is provided as a separate virtual video stream. A first video stream 110 represents the entire image capture region 102 captured by the image capture device 108 and provides an in-room complete view of every user and object within the field of view of the image capture device 108 in the image capture area 102. The first virtual video stream 110 is assigned a first virtual identifier (in a manner discussed below) to uniquely identify the first virtual video stream 110 so that the video data in the first virtual video stream can be processed by the remote user interface in a manner discussed below. The result of the recognition processing indicates that five regions within the image capture area contain either an object or user that has been recognized by a recognition engine that is trained to identify items within a video frame.

Recognition processing performed on the video data captured by the image capture device 108 indicates that User A, User B, User C and User D have been recognized. In one embodiment, images of the users are captured and compared to an image repository that is linked with user names and identities and has resulted in these users being recognized. Based on this recognition, the meeting application forms bounding boxes around the recognized faces of Users A, B, C and D and extracts video data contained within each respective bounding box by cropping and assigns virtual video stream identifiers to each cropped region. Second virtual video stream 112 is associated with User A. Third virtual video stream 114 is associated with User B. Fourth virtual video stream 116 is associated with User C and fifth virtual video stream 118 is associated with User D.

Recognition processing performed by the meeting application executing on the server in FIG. 2 also recognizes an object corresponding to a writing surface 104. In one embodiment, the recognition processing recognizes this object based on a preset position information that is input into the meeting application and which represents, on a pixel by pixel location within the image capture area 102 where the object to be recognized is positioned. In another embodiment, a recognition engine has been trained to recognized a plurality of different types of objects in order to automatically identify various objects within a frame. In certain embodiments, the recognition engine may be trained to recognize objects such as books or papers, including text written thereon, which can be extracted from the video data stream captured by the image capture device 108. In this exemplary embodiment, the recognition processing identifies the writing surface 104 and extracts video data from the region of the image capture area corresponding to the recognized object 104 and associates this information with a sixth virtual video stream 120.

To effectively separate virtual participants (cropped objects) from real participants, the meeting application initiates a virtual meeting session 122 having a meeting identifier 124 and associates that virtual meeting session with a current online meeting session 126. The current online meeting controls the backend meeting processing including audio communication between participants that have joined the current online meeting session 126. In one embodiment, the online meeting session 126 is initiated using a control application such as MICROSOFT TEAMS® or other similar type of application whereby each of Users A-d have joined as meeting participants. In one embodiment, the meeting application that generates the virtual meeting session identifier 124 and the control application that controls the current online meeting session are separate applications. The virtual meeting session 122 includes a virtual meeting identifier that enables remote access to the virtual meeting session. In one embodiment, the current online meeting session 126 enables all online participants 140 to join and also includes a current online meeting session user interface 142 that is accessible to viewable by participants 140 as well as the virtual meeting session 122.

The virtual meeting identifier links to information identifying all virtual video streams 110-120 and joins the current online meeting session 126 as a participant using the virtual meeting session identifier 124 initiated by the meeting application executing on server in FIG. 2. In another embodiment, instead of staring another virtual meeting session, our application may be able to set a virtual flag to participant information to distinguish virtual participants from real participants. Using these virtual webcam feed participants, all users (meeting participants) are able to see cropped video via online meeting system. Most importantly, users are able to see the detail of persons or objects in the office by selecting a virtual participant.

The various virtual video streams 110-120 associated with the virtual meeting session 122 are communicated to one or more remote users that are able to display an augmented user interface 130 that enables display of one or more of the virtual video data streams 110 in different regions of the user interface. The virtual meeting session 124 includes an identifier that is selectively accessible using a web browser executing on a computing device such as a laptop, desktop, smartphone or tablet computer. The virtual meeting session identifier provides a series of individual video sources that can be rendered within a web browser user interface and, as will be discussed hereinafter, enable a user to selectively choose from the plurality of virtual video streams 110-120 to be displayed in defined locations within the user interface being rendered on the remote computing device. In in the exemplary view shown in FIG. 1, the user interface 130 includes three display regions that each can display one or more of the virtual video data streams 110-120 associated with the virtual meeting identifier 122 that is used to obtain access thereto. In this example one display region displays the first virtual video stream 110 representing the entire image capture area. A second different display region displays the sixth virtual video data stream 120 representing the recognized object being the writing surface 104 and a third display region different from the first and second display regions displays the second through fourth video data streams associated with each of the respective Users A-D. The position of the display regions and their respective contents is merely exemplary and remote user may selectively change the positions of the video data streams received based on access using the virtual meeting identifier 122.

The system according to the present disclosure is also illustrated in FIG. 2 and includes one or more servers 200, one or more cloud service applications 230 and one or more client applications executing on a client computing device 250 such as a laptop, tablet, computer, smartphone or the like.

The system includes one or more servers 200 that connects with camera 108 in a particular physical location such as an office or meeting room to capture an image capture area 102. The server 200 controls the camera 108 to continually capture video images 201 within the predetermined field of view of the camera 108. The camera 108 is connected to the server 200 via a streaming interface 202 that receives video data 201 in a video data format. The streaming interface 202 may include a video capture card that is coupled to the camera 108 via a connector cable compatible with the HDMI standard. In another embodiment, the streaming interface 202 may be a network connector that is coupled to a network and received packetized video data 201. The server 200 includes a plurality of applications that perform the functionality described herein both in FIG. 1 and hereinafter. includes an application that detects objects as noted above such as people and/or whiteboards. The server 200 includes an video processing application 204 application that crops and corrects image data that is associated with the one or more detected objects and assign the cropped regions virtual video data stream identifiers. The video processing application assigns virtual identifiers having a defined format shown in Table 1.

TABLE 1

| Virtual Identifier Format |
|---|
| {Type}\|{Name}\|{ID} |

The virtual identifier format includes "{type}" information that characterizes or otherwise describes the virtual video data stream associated therewith. The server performs image recognition process to obtain "type" information. The server 200 determines one of the type from: Room, Person, Whiteboard, Remote, and Object Examples of type information includes, but is not limited to (a) room information; (b) object information; and (c) user information. Room information identifies that the cropped video data stream identifies description of an image capture area. Object information identifies that the cropped virtual video data stream associated therewith is an object as recognized using the recognition processing described hereinabove. User information indicates that the cropped video data stream includes video of a person (or user) that is recognized as a result of the recognition processing. In another embodiment, the type information can also be remote user information indicating that, in a case where remote user video data can be captured, that the video data stream originates from a remote user. The {name} information includes information that characterizes the particular cropped virtual video data stream. Examples includes a name of the room where the system is deployed, names of a user determined based on facial recognition and comparison with a face image repository having user names associated with the stored faces (in an event the user is not recognized, a generic name such as "Guest User" can be substituted. Additionally, names of the type of object that was recognized such as "whiteboard"; "book", "paper", "region of interest", etc. can be used as part of the {name} information. In an event more than one of the same type of object are recognized, a numerical identifier can be added so that the system can recognize two different of the same types of objects (e.g. "whiteboard_1" and "whiteboard_2"). In one exemplary embodiment, The server performs face recognition process to obtain "name" information. If the server cannot identify a specific person, the "name" is determined as "Guest". The "name" of the other type than the person is determined based on predetermined rules. For example, the name of the video stream whose type is whiteboard is determined as "whiteboard A". The "{ID}" is a unique identifier that notes the different numbers of virtual video data streams that were recognized during recognition processing. In one embodiment, The server identifies "ID" by referencing a database based on the Name label. As discussed in the exemplary embodiment above, the recognition processing performed on the video data stream 201 captured by the camera 108 and received via the streaming interface 202 is processed by the processing application 204. As a result of that processing with respect to FIG. 1, a plurality of regions are recognized and shown in Table 2 with the reference numbers from FIG. 1 in parenthesis in the Video Stream Name column. The information below in Table 2 is then used by a registration service 206 to register the virtual participants and their associated identifiers for use by other components of the system as discussed hereinbelow.

TABLE 2

| Virtual Video Stream Identifiers | | |
|---|---|---|
| Video Stream Name | Virtual Stream Number | Identifier |
| Meeting Room (110) | Participant ID: 1 | {Room}\|{ConferenceRoom A}\|{xxx1} |
| User A (112) | Participant ID: 2 | {Person} {Mike Davis}\|{xxx2} |
| User B (114) | Participant ID: 3 | {Person} {Joe Smith}\|{xxx3} |
| User C (116) | Participant ID: 4 | {Person} {Jane Jones}\|{xxx4} |
| User D (118) | Participant ID: 5 | {Person} {John Connor}\|{xxx5} |
| Whiteboard (120) | Participant ID: 6 | {Whiteboard}\|{Whiteboard}\|{xxx6} |

The server also operates as a meeting connector 208 to associate each of the cropped video regions from within a single image frame with a virtual video stream identifier from Table 2 join as part of the virtual meeting which also can be joined as part of the current online meeting.

The system also includes one or more cloud services 230 to manage online meeting sessions and virtual meeting sessions. An exemplary cloud service is an online meeting application such MICROSOFT TEAMS, ZOOM and WEBEX and the like. The application executing on the server acts as an input to the online meeting application. More specifically, the registered virtual participant identifier is provided from the connector 208 as input a meeting management control application 232 and concurrently to the current online meeting session 236. The video data 210 which represents one or more virtual video data streams that are associated with respective identifiers from each of the cropped regions forming the virtual video data streams are provided to the virtual meeting session 234.

The system further includes one or more client applications executing on a client computing device 250 that allows each remote participant 260 to access the online meeting application 254 and receive and interact via a web browsing application 252 with the different virtual video data streams 210 captured by the camera 108 connected to the server 200 via the virtual meeting session using the presently disclosed meeting application. The client connects with Cloud Service 230 and enable users to operate any functions related to online meeting 252. Client device 250 can obtain streaming videos representing one or more of the virtual video data streams 210 from Cloud Service 230 and display them in a user interface on a display of the client device 210. The client device 250 would have two user interfaces, one for an online meeting 254 such as the 3$^{rd}$ party meeting application (e.g. TEAMS) and the other is for the virtual online meeting virtual online meeting via the web browser 252.

In exemplary operation, a User Interface (UI) generator determines the display layout based on the Display Name received from the cloud service. The Display Name is a name of each participant displayed in a video conferencing platform that the User Interface is displayed in. After logging-in, Client A identifies, from video streams received from the cloud service, a video stream whose type is "Room" and displays it. When User A selects "white board view mode" the Client A identifies a video stream whose type is "white board" and display it instead of the video stream whose type is "Room". When User A selects "Two view mode", the Client A identifies a video stream whose type is "Room" and display it in a large region of the display screen and also identifies a video stream whose type is "Whiteboard" and displays it in a smaller region of the display screen. The videos in the large region and the smaller region can be alternated with each other via the use of a switching button.

Figure 3:
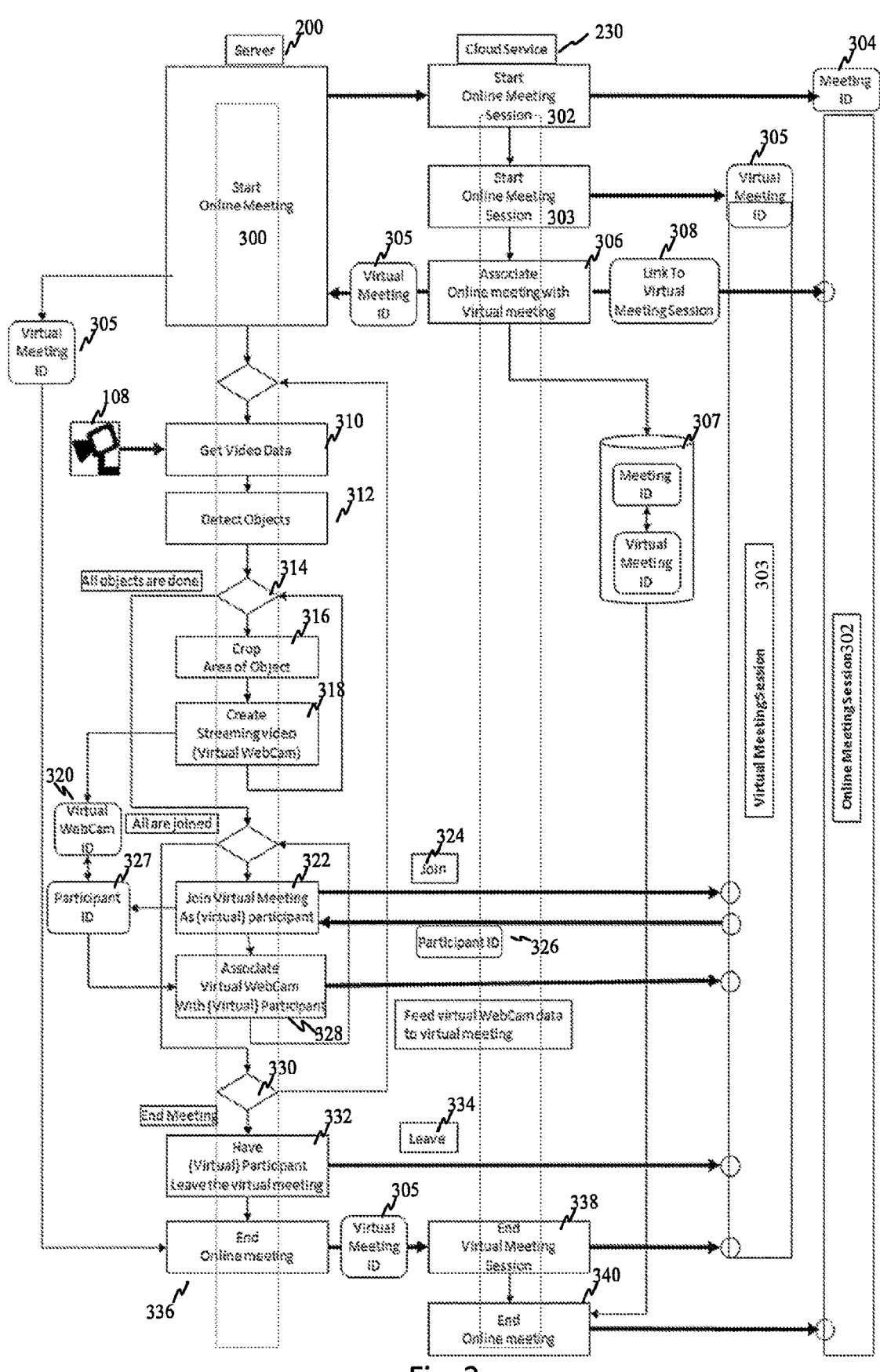
FIG. 3 is a flow diagram illustrating exemplary operation of the online meeting solution according to the present disclosure.

FIG. 3 is a flow diagram that details the data flow and algorithmic operations described herein with respect to the present disclosure. The Server 200 receives a meeting start request 300 from users at a predetermined location such as an office. The server 200 sends the request 300 to the Cloud Service 230. In one embodiment, the meeting request may be initiated by users sending a start meet command from a user interface coupled to the server 200 or via gesture command recognized by camera 108 coupled to the server 200 Next, the Cloud Service 230 starts a first online meeting session 302. This first online meeting session 302 would be control meeting application session such as one created by TEAMS. Once the online meeting session starts, the Cloud Service obtains a "meeting id" 304. With an integration with a control meeting application, a "meeting id" 304 is issued by the control meeting application. Without an integration, the "meeting id" 304 is generated by the Server 200.

After starting the first online meeting session 302, the Cloud Service 230 starts a second meeting session 303 representing a virtual meeting session. Once the virtual meeting session 303 starts, the Cloud Service 230 obtains a "virtual meeting id" 305. A "virtual meeting id" 305 is generated by the Server 200. The Cloud Service 230 starts the second (virtual) meeting session 303 in order to provide information to be used to generate a separate UI for the augmented office view from a user interface associated with the control meeting session 302. It should be noted that the Cloud Service 230 may obtain the "virtual meeting id" 305 before getting or generating the "meeting id" 304 explained above.

The Cloud Service 230 performs an association step 306 that associates the "meeting id" 304 with the "virtual meeting id" 305 and stores them in a database 307. The Cloud Service 230 sends the "virtual meeting id" 305 to the Server 200. The Server keeps the "virtual meeting id" in its memory or database. Additionally, after associated the "meeting id" 304 with the "virtual meeting id" 305, a link 308 to the virtual meeting session 303 is provided to the online meeting session 302 created by the control meeting application such that users connected to the online meeting session 302 via the control meeting application can directly link to and access the virtual meeting session 303 by selecting the link 308 which causes a web browser application to open on the client device as discussed above.

Upon starting both the first meeting session 302 and the second, virtual meeting session 303, the server 200 controls the camera 108 to begin capturing a streaming video data 310 from the camera 108. In one embodiment, the camera is a network camera. In another embodiment, the camera is any dedicated camera having a field of view of substantially the entire predetermined location such as the meeting room in the office.

The server 200 performs recognition processing 312 to detect one or more objects from within the frames of video data 310 captured by the camera 108. Recognition processing 312 identifies one or more predetermined objects such as a person, a whiteboard, a display screen and a document. These are merely exemplary and any object may be set as a one of the predefined objects detected during object detection.

Decision processing for each object detection begins at 314 where the server 200 queries whether there are detected objects 312 that have not been further processed and from which a virtual video data streams have not yet been made. The iterative processing for each detected object is as follows. In 316, the server performs image processing to crop the detected object from the video data 310 and in 318, creates a new (another) streaming video object such as virtual video data stream or virtual image feed of the video data within the cropped region. The virtual video data stream object is assigned a "virtual video data stream id" 320 as noted in Tables 1 and 2 which generated by the Server which is stored in memory or in a database. The "virtual webcam id" is related to the detected object and its streaming video.

After creating virtual objects based on the object detection in 316-320, and after it is determined at 314 that the video data stream 310 contains no further recognized objects or people, the server performs the following processing for each virtual object detected and that has a virtual video data stream identifier 320 associated therewith.

Using the respective virtual video data stream identifiers 320, the server 200 cause the respective detected objects to join 322 the virtual meeting session 305 as a virtual participant via a join request 324 transmitted from the server 200 to the cloud service 320. Once the detected object joins the virtual meeting session 303, the server 200 obtains a "virtual participant id" 326 from the Cloud Service 230. The Cloud Service generates a "(virtual) participant id" 326 when someone (or something) joins the virtual meeting session 303. The server causes the participant ID 326 to be stored 327 in in memory or database The server performs association processing 328 and associates the "(virtual) participant id" 326 with the "virtual video data stream id" 320 and feeds, as input, the associated virtual video data stream 320 to the virtual meeting session 303 as a virtual participant stream video. One or more videos associated with the virtual meeting session are provided to Clients in response to a request received from a client application or device as will be discussed above in FIG. 1 and again in FIGS. 4 and 5A and 5B. The processing associated with steps 322-328 are repeated for each virtual video data stream ID 320.

Meeting ending processing is performed beginning at 330 which determines if there has been a meeting end request received. If there has been no meeting end request, processing revers back to 310. In a case where an end meeting request has been received, the server performs disconnection processing 332 which generates a disconnection (e.g. leave meeting) message 334 that is transmitted to the virtual meeting session 303 causing all participants video data streams to leave the virtual meeting session 303 resulting in all of the video streaming to stop. Thereafter, end processing 336 is performed whereby the server 200 sends "virtual meeting id" 305 and an end-meeting request 338 to the Cloud Service 230. The Cloud Service obtains the "online meeting id" 304 related to the "virtual meeting id" 305 and the Cloud Service ends both the virtual meeting sessions 303 via first end processing 338 and the control meeting session via second end processing 340.

Figure 4:
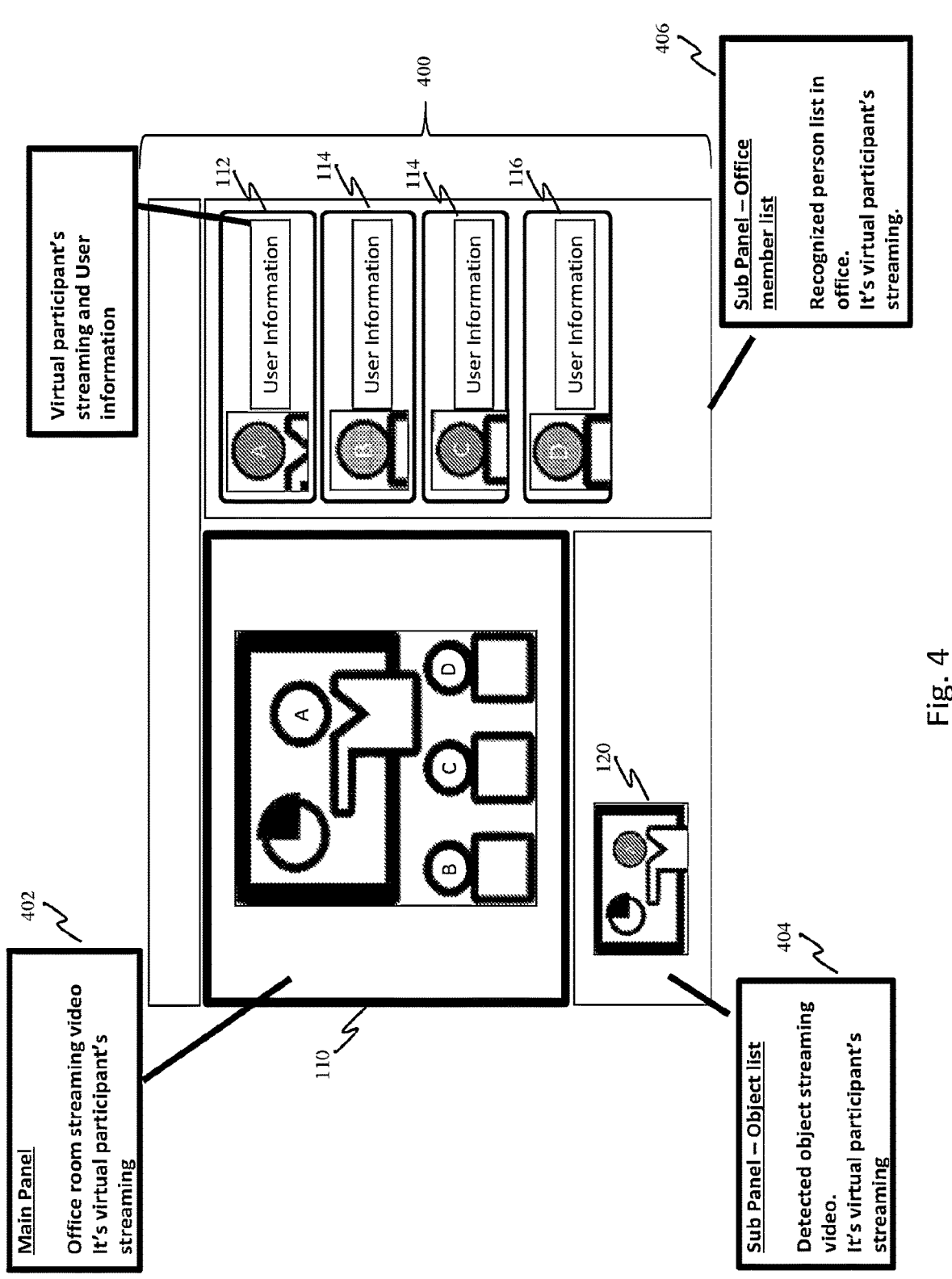
FIG. 4 is an exemplary user interface display for a remote participant using the online meeting solution according to the present disclosure.
Figure 5A:
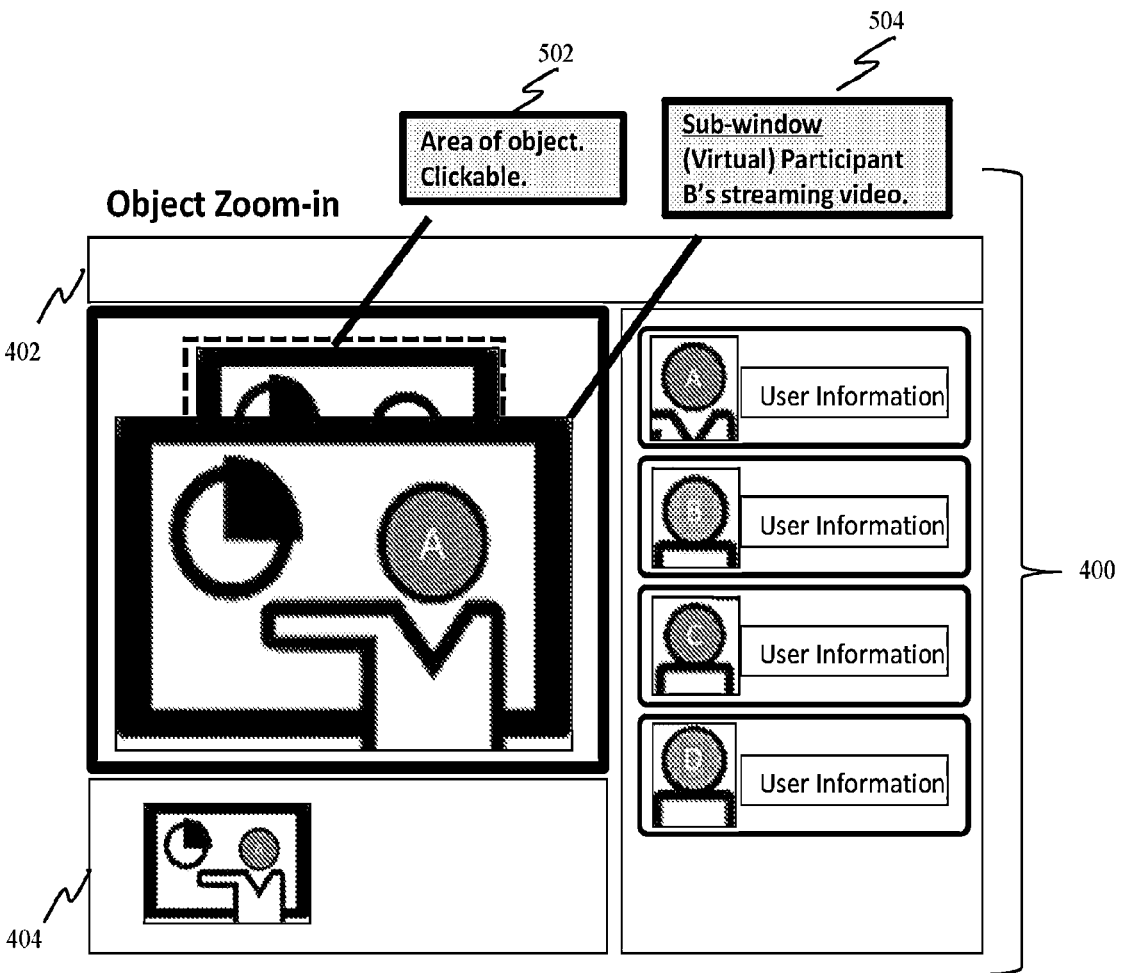
FIG. 5A-5B illustrate exemplary user interface displays for a remote participant using the online meeting solution according to the present disclosure.
Figure 5B:
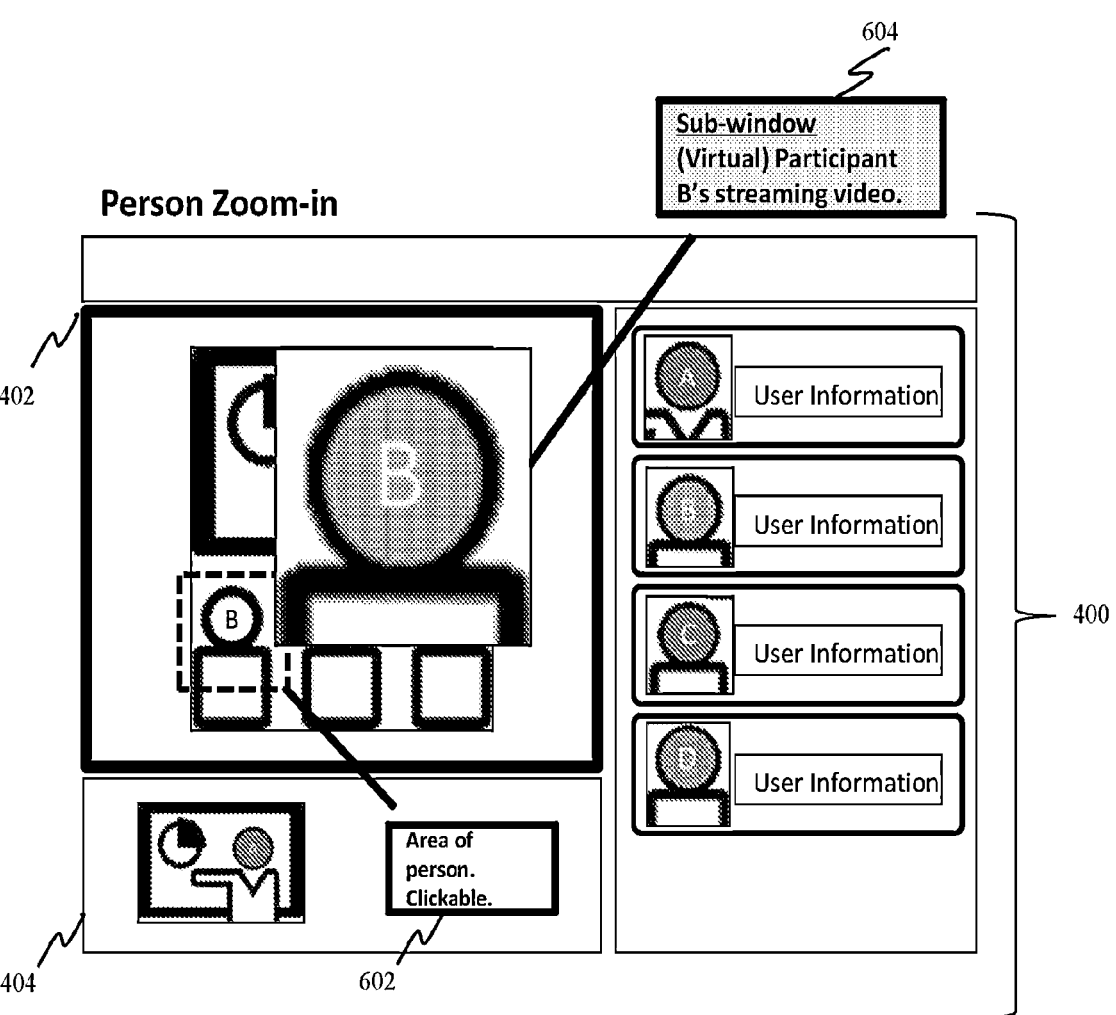

FIGS. 4 and 5A and 5B are exemplary user interfaces displayed by the client device that can participate in the online meeting. Once the control meeting session 302 starts, users join the control meeting session using a dedicated control meeting application having its own dedicated user interface. Users join the virtual meeting session 303 via a web browsing application executing on the client device. The cloud service 230 has already associated the online meeting session with the virtual meeting session so the online meeting session has a link to the virtual meeting session. Once a user selects the link to the virtual meeting, the Client UI is opened. The user is able to join the virtual meeting session via the Client UI and the Client sends a request for one or more virtual video data streams (e.g. a cropped video representing a video of a partial region) to the Cloud Service 230, and the Client displays the one or more virtual video data streams received from the Cloud Service 230.

In the virtual meeting session 303 viewable via the web browser executing on the client device, virtual video data streams representing detected objects or detected people streaming as a (virtual) participant video. The user interface within the web browser executing on the client device provides users functionalities to switch the streaming video on the screen so users are able to change views between all of the virtual video streams that are generated based on recognition processing above. It should be noted that the user interface enables the client device to be able to reproduce one or more videos each associated with the participant id and one or more videos each associated with the virtual participant id after termination of the online meeting session. In another embodiment, the server may store each video and provides one in response to a request from the Client.

In another embodiment, each participant id is associated with security level information, and one or more videos associated with the virtual video data stream ids (or virtual participant ids) are only provided to client devices that have corresponding to security level information having a higher security level than the predetermined level. Alternatively, the sever 200 may be able to determine if the video associated with the virtual video data stream id is to be provided based on a comparison between the security level of a Client (or client device) requesting the virtual video data stream and the security level of attributed to the video data stream.

As another embodiment, the Cloud Service may provide position information indicating a position of the cropped region within the video of the meeting space such that the Client displays the cropped when the user indicates a region, on the video of the meeting space, defined by the position information.

FIG. 4 illustrates a user interface 400 caused to be displayed on a client device via a web browser that uses the virtual meeting ID link to join the virtual meeting session. The user interface 400 includes a plurality of display sections that can selective display respective ones of the virtual video data streams corresponding to objects and/or persons detected during the recognition processing performed on the video data as described above. The user interface generator makes use of the virtual video data stream ID in is associated format to generate the user interfaces being displayed on the client device.

The user interface generator causes the user interface 400 to be generated and includes a first display region 402, a second display region 404 and a third display region 406. In this exemplary embodiment, the first display region 402 is controlled to display virtual video data stream 110 corresponding to the full image capture area is being displayed. The user interface generator obtains the virtual video data stream ID and uses that information to position the video data stream within the user interface 400. In the second display region 404, one or more icons representing one or more detected objects able to be selected is displayed. As shown herein, an icon corresponding to the virtual video data stream identifier 120 of the writing surface object 104 is displayed. A user can select the icon causing the user interface generator to request the video stream of the whiteboard and cause that video data stream to be displayed within the first display region 402 and causing the previously displayed video data stream to stop being displayed and present the previous video data stream within the second display region 404. In other words, video data streams swap positions within the user interface 400 which allows the user to selectively determine which of the plurality of virtual video data streams are to be viewed at a given time. The user interface 400 includes a third display region 406 that displays user identification icons corresponding to the one or more users recognized as part of the user recognition processing described above. As shown herein, the icons correspond to the virtual video data streams 112, 114, 116 and 118 from FIG. 1. The icons present information about each of the users that may be obtained using the {name} information in the virtual video data stream identifier associated with each respective virtual video data stream. Moreover, the {type} field in the identifier is used by the user interface generator when positioning one or more of the virtual video data streams or user selectable icons that represent virtual video data streams.

In one embodiment, the icons in the third display region are selectable and cause the corresponding virtual video data stream of that user to be displayed in the first display region. In another embodiment, only at a particular time or based on a particular designation associated with a respective user can the icons in the third display region be selected to be shown in the first display region 402. For example, in an instance where one of the respective users is identified as a presenter or speaker would that users icon be selectable causing the display of the virtual video data stream of the user in the first display region 402.

FIGS. 5A & 5B illustrate additional embodiments of the user interface 400 shown in FIG. 4. The user interface 400 includes common elements, the description of which need not be repeated as the description of FIG. 4. As such, only the differently labeled elements and their control operation will be discussed.

In FIG. 5A, in the main display region 402 of the user interface 400. The virtual video data stream 110 is controlled to be displayed. More specifically, the user interface generator uses the first virtual video data stream identifier as the source for displaying the video data stream representing the entire image capture area 102 being captured by the image capture device 108 in FIG. 1. From within this view being displayed a selection indicator 502 (illustrated by the dashed lines in FIG. 5A) is made visible to the remote user. The selection indicator 502 indicates that the area within the selection indicator represents a region of interest 504 including an object (or person) that was recognized during recognition processing that has its own virtual video data stream and associated virtual video data stream identifier. This allows for video data within the selection indicator 502 to be displayed. A user may select the section indicator 502 and cause the video data stream associated therewith to be displayed within the first display region 402 as selected video data 504 that provides a zoomed-in version of the information within the selection indicator 502. In doing so, the user interface 402 receives a selection instruction via user input at the user interface of the selection icon. The user interface generator obtains the virtual video data stream ID associated with the selection indicator 502 and causes the video data associated with the respective virtual video data stream ID to be displayed within the first display region. More specifically, the virtual video data had been joined to the virtual meeting session as a virtual participant and the selection of the selection indicator 502 causes the video data associated with the participant ID corresponding to the virtual video data is caused to be displayed in the first display region 502. As shown herein, the selected virtual video data is superimposed over the video data from which the selection had been made. However, this is for purposes of example only and, in some embodiments, selection causes the selected virtual video data to replace the virtual video data stream from which the selection was made in the first region with the selected virtual video data and cause an icon to be displayed in the second display region 404 that enables the user to reselect the virtual video data from which the selection has been made. FIG. 5B illustrates the same processing described in FIG. 5A with the exception the selection indicator 602 identifies a region of interest representing User B and the selection thereof causes the virtual video data stream of the participant ID associated with User B to be displayed within the first display region as the region of interest video data stream 604.

FIGS. 6A-6D illustrate another embodiment of a user interface 600 generated according to the present disclosure. As shown herein, the user interface 600 includes view control region 602 that includes user selectable icons for controlling the display view of a display region 604 in which virtual video data streams corresponding to the icons in the view control region 602 are caused to be displayed. The user interface 600 also includes a participant region 606 which includes user selectable participant icons 620a-620f that represent the virtual participants each having respective virtual video data stream and that are joined to the virtual meeting session 303 as described in FIG. 3. The participant region 606 includes one or more icons representing the different people (620a-620e) recognized as part of the recognition region as well as one or more objects (620f in FIG. 6D) that were recognized as part of the recognition processing described above.

Figure 6A:
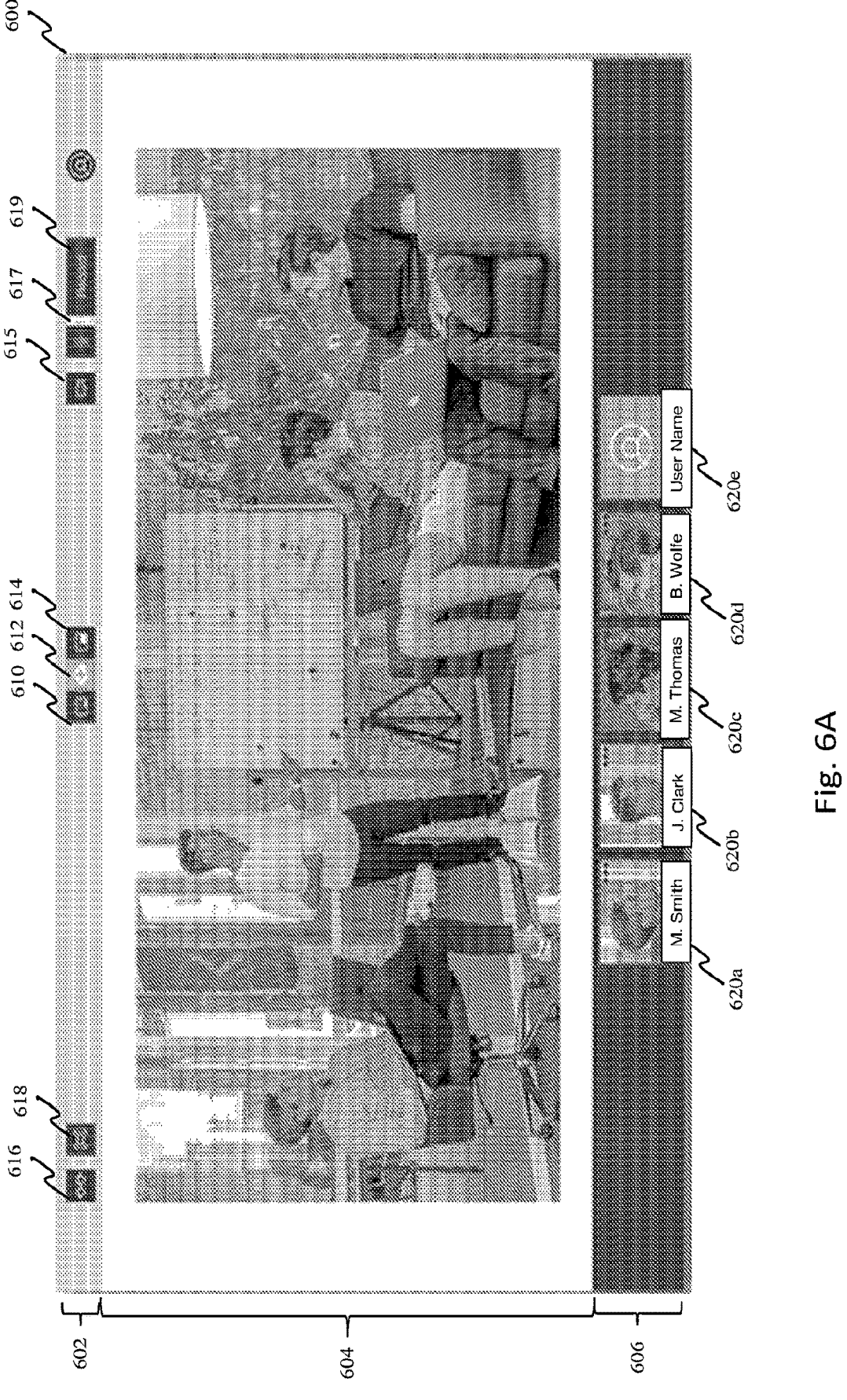
FIGS. 6A-6D illustrate exemplary user interface displays for a remote participant using the online meeting solution according to the present disclosure.

The view control icons in the view control region 602 include an image capture region icon 612 that represents the video data stream that corresponds to the entire image capture region being captured by the image capture device 108 in FIG. 1. This provides a full field of view of the room in which the system according to the present disclosure is deployed. FIG. 6A illustrates the display processing when the image capture region icon is selected whereby the virtual video data stream associated with the image capture region (110 in FIG. 1) is caused to be displayed in the manner discussed above.

Figure 6B:
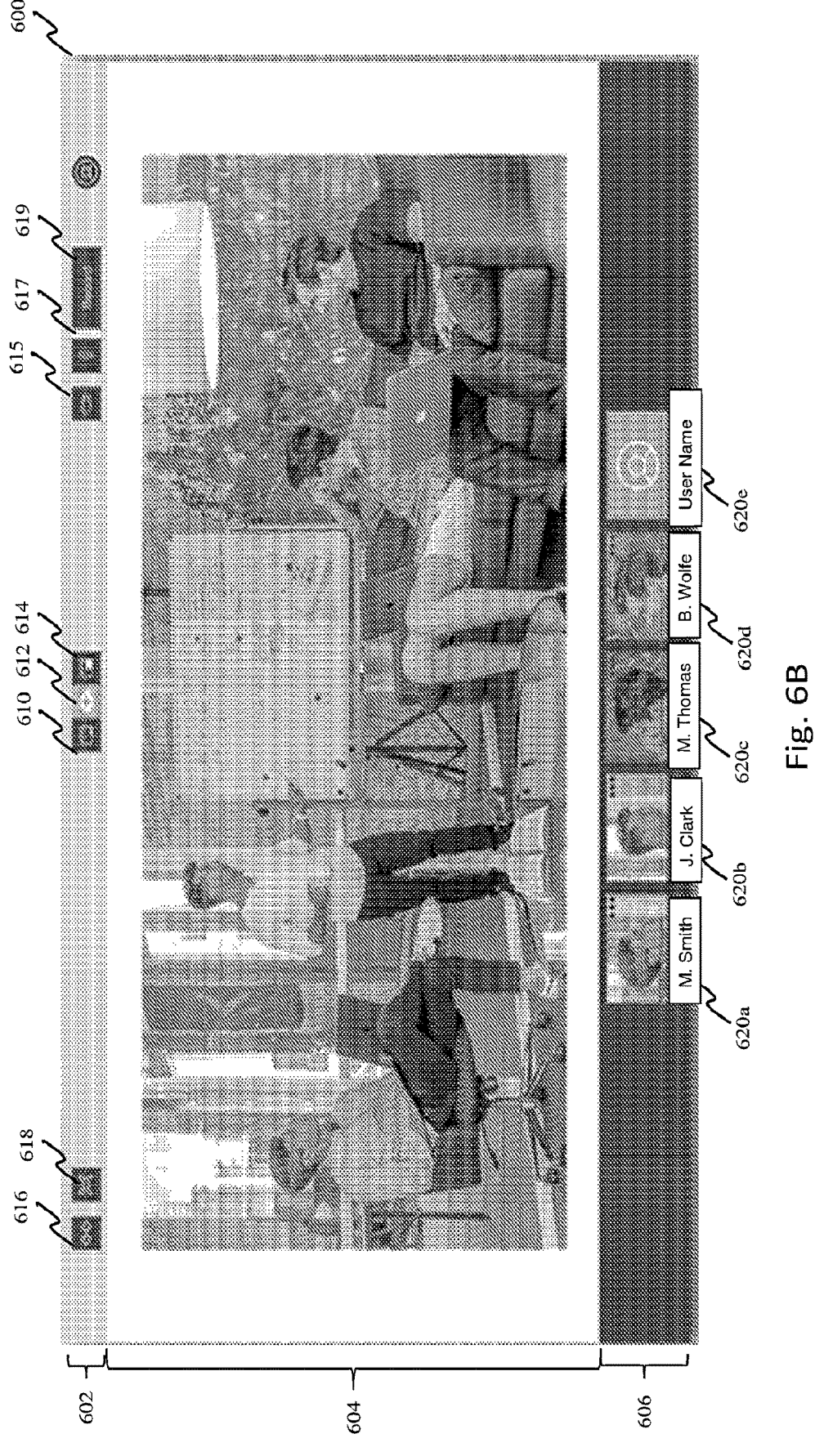

At least one object icon 610 is also present, the selection of which causes the video data stream corresponding to the particular recognized object to be displayed in display region 604. In one example, the object icon corresponds to the recognized writing surface 104 in FIG. 1. The selection of the object icon 610 causes the virtual video data stream associated with that object to be displayed within the display region 604 as shown in FIG. 6B. While only a single object icon 610 is shown in the view control region 602, it should be understood that a plurality of object icons 610 may be displayed each corresponding to a different objects. In certain embodiments, a plurality of object icons corresponding to different ones of the same types of objects can be present within the view control region 602. In the example shown in FIG. 6B, the object corresponding to object icon 610 is a whiteboard and the selection of icon 610 causes a video stream of the whiteboard extracted from the single camera view of the image capture region to be shown in real time within the display region 604.

Figure 6C:
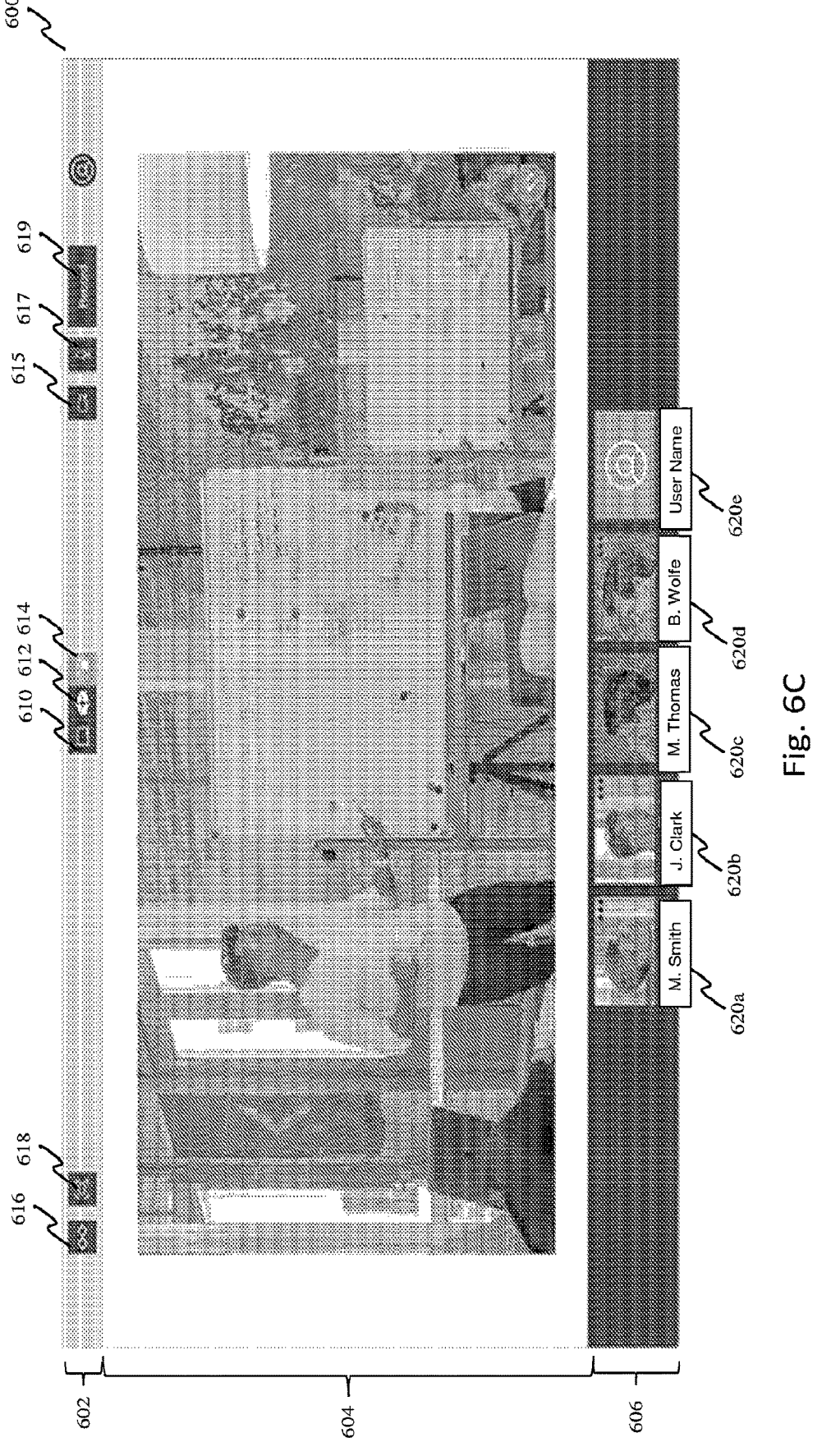

A multiple view icon 614 is present in the view control region 602 of user interface 600. Selection of the multiple view icon 614 causes a different type of view to be displayed in the display region 604. More specifically, the multiple view icon 614 causes more than one virtual video data stream to display simultaneously within display region 604. This is illustrated in FIG. 6C. In one embodiment, selection of the multiple view icon automatically causes the virtual video data stream associated with the full image capture region 102 to be displayed along with the virtual video data stream associated with the object corresponding to the object icon 614. In the example shown in FIG. 6C, selection of the multiple view icon 614 causes the virtual video data stream of the writing surface 104 in FIG. 1 to be displayed in a sub-region of the display region 604 superimposed over the virtual video data stream representing the image capture area 102 in FIG. 1. While the display of two video data streams is shown in FIG. 6C superimposed over one another, this is for purposes of example only. In another exemplary embodiment, the two different video data streams may be displayed in separate windows adjacent to one another in display region 604. In other embodiments, a plurality of multiple view icons 614 may be included that allow for the selection of up to three different participant video data streams to be displayed within display region 604.

Figure 6D:
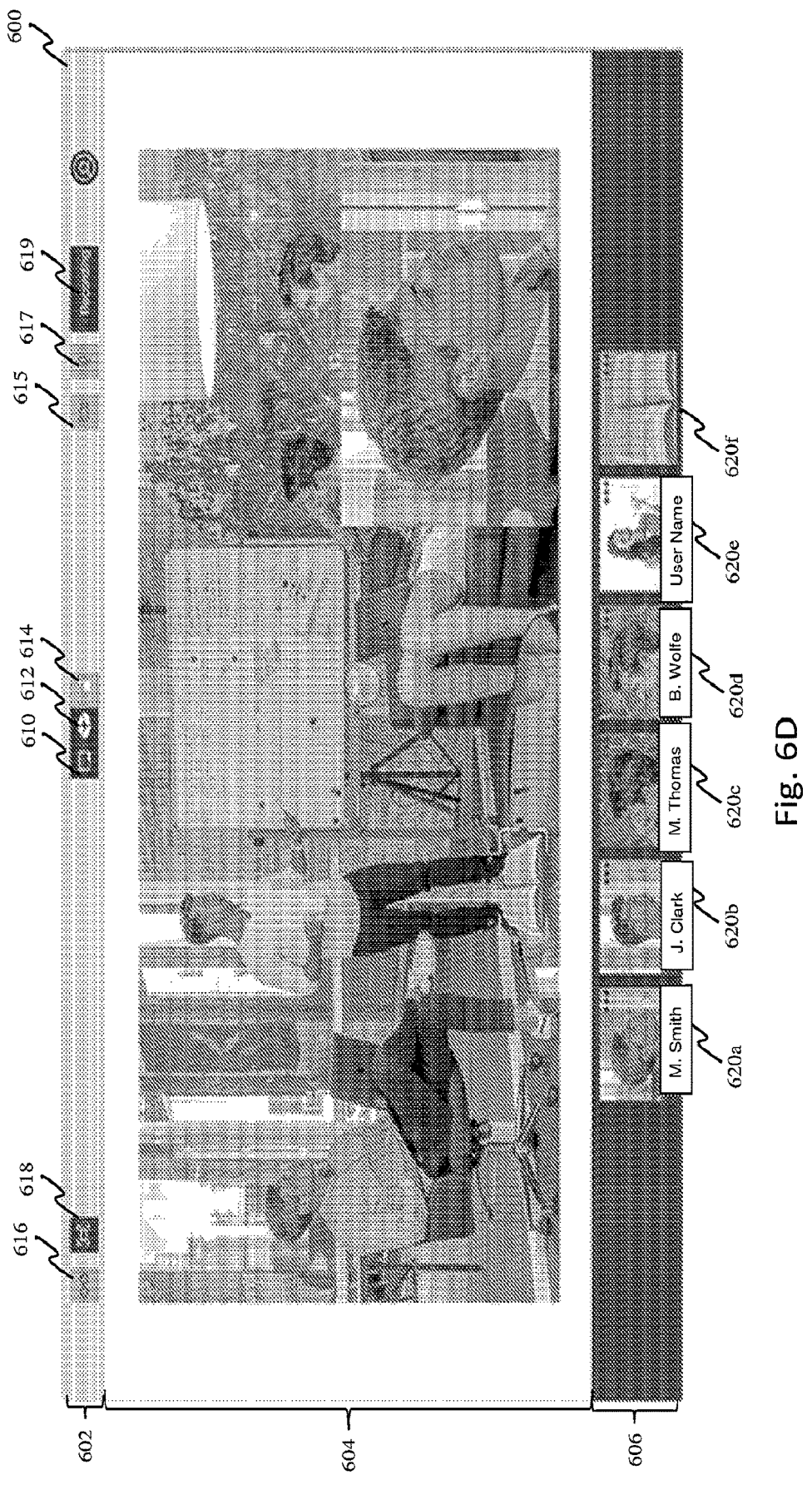

View control region 602 also includes participant selection icon 616 that allows for a user to select a participant icon 620a-620f to be displayed within the sub-region of display region 604. As shown in FIG. 6D, the participant selection icon 616 is selected along with the user icon 620a corresponding to one of the users joined as virtual participants to the virtual session. This causes the virtual video data stream associated with the selected user 620a to be shown in the sub-region of the display region 604 in FIG. 6D.

In other embodiments, view control region 602 includes one or more action icons that control one or more actions within an ongoing meeting. A video icon 615 enables a remote user view the user interface 600 to control a camera on the remote computing device to begin to capture video data of the remote user and begin transmitting the captured video of the remote user to the virtual meeting session 303. In some embodiments, this enables the meeting application to obtain a virtual video data stream of the remote user and identify that stream as the remote user and join the remote user video to the virtual meeting session 303 in the manner discussed above in FIG. 3. A sound icon 617 is also shown, the selection of which controls the microphone of the remote computing device to either permit or prohibit the microphone from capturing sound. A record icon 619 is further included and controls a recording process to begin storing all information being displayed on the user interface and which originates from the virtual meeting session into a data file in memory. In one embodiment, the recorded meeting may be stored locally at the remote computing device. In another embodiment, the recorded meeting may be stored at the server 200 or cloud service 230.

Further operation of FIGS. 6A-6D will now be discussed. To generate the user interfaces shown in FIG. 6A-6D, the remote client device receives, from the cloud service 230, the following video data streams shown in Table 3.

TABLE 3

| Video Streams from Cloud Service |
| --- |
| Video stream 1 for Meeting room (Virtual participant ID 1) |
| Video stream 2 for White board (Virtual participant ID 2) |
| Video stream 3 for Participant 1 (Virtual participant ID 3) |
| Video stream 4 for Participant 2 (Virtual participant ID 4) |
| Video stream 5 for Participant 3 (Virtual participant ID 5) |
| Video stream 6 for Participant 4 (Virtual participant ID 6) |
| Video stream 7 for Book (Virtual participant ID 7) |
| Video stream 8 for Remote user B (Participant ID B) |

The cloud service 230 transmits video streams 1-7 to the remote client device using a different communication session than a communication session for transmitting the video stream 8. The server 200 provides to the remote client device, via the cloud service 230, Display Name information with the predetermined display format described above in Tables 1 and 2 and which are incorporated herein by reference.

Based on the information received from the cloud service, the remote client device begins to display, in display region 604, video whose type is "room" as illustrated in FIG. 6A. When the remote user a the remote client device selects Whiteboard view mode (610 in FIGS. 6A-6D), the user interface generator causes the video displaying from the video whose type is "Meeting room" to the video whose type is "White Board" to be switched as shown in FIG. 6B. When the multiple view icon 616 corresponding to multiple view mode is selected, the client device causes both the video whose type is "Room" and the video whose type is "White Board" to be displayed in the display region 604 as shown in FIG. 6C. When the remote user a the client device selects an object from the participant region 606 (e.g. menu bar), the client device changes a video to be displayed during the two view mode shown in FIG. 6D.

In another exemplary embodiment, the client device can identify a video of a meeting room and a video of a whiteboard by performing image recognition process on each of the video streams. The client device can identify, as a video of the meeting room, a video having the oldest Virtual Participant ID from among the Virtual Participant IDs 1-7 in Table 3, and the client device can identify, as a video of the whiteboard, a video having the second oldest Virtual Participant ID from among the Virtual Participant IDs 1-7 in Table 3.

In another embodiment, the cloud service 230 provides position information indicating a position of each person and object in the video representing the image capture area 102 using for example, a WebSocket named SignalR. This is a mere example of a method used to provide clients' positions and any method that would enable practice of the present embodiment is applicable. The client device identifies, based on a position of the screen selected by remote user, a Display Name of an object that was selected by the remote user and displays the video stream associated with the identified Display Name. If, for example, a user operation performed during "two view mode", the video stream is displayed in the sub-region within the display region 604.

In case that a Whiteboard has not been detected from captured video, the user interface generator will disable the object selection icon 610 that displays the whiteboard view button in the view control region 602. This causes no action to be take when the user selects the whiteboard view button 610. In another embodiment, if the user interface generator does not receive a video data stream identified as "whiteboard", the user interface generator causes an error messages when a user selects the whiteboard view button 610.

In another exemplary embodiment, if two or more whiteboards are been detected from the captured video and the client device receives two or more video streams whose type is Whiteboard, the Client A can switch the video stream to be displayed on the screen each time the Whiteboard view button 610 is selected. (e.g. Whiteboard A→Whiteboard B→Whiteboard C→Whiteboard A . . . if there are three video streams of whiteboards). In yet another exemplary embodiment, the clients can display two or more Whiteboard buttons if two or more Whiteboards are detected.

The source for each of the elements included in the Display Name information is the server 600 and it used by the user interface generator to generate the user interfaces described herein. These elements are determined as follows. For "Type" information, the server 200 performs image recognition process to obtain "type" information. The server determines one of the type from: Room, Person, Whiteboard, Remote, and Object. For "Name", the server performs face recognition process on detected faces to obtain "name" information. If the server cannot identify a specific person, the "name" is determined as "Guest". The "name" of the other type than the person is determined based on predetermined rules. For example, the name of the video stream whose type is whiteboard is determined as "whiteboard A". For "ID", the server 200 identifies "ID" by referencing a database based on the Name label.

A User Interface (UI) generator determines the display layout based on the Display Name received from the cloud service 230. The Display Name is a name of each participant joined to the virtual meeting session displayed in a video conferencing platform that the User Interface is displayed in. It should be noted that users, objects, and rooms are all participants of the virtual meeting sessions. As such, participant should not merely be understood to be a human participant. After joining the virtual meeting session, the remote user at the client device identifies a video stream whose type is "Room" received from the cloud service 230 and causes that video stream to be displayed in display region 604 (FIG. 6A). When the remote user selects "white board view mode" 610, the user interface generator obtains a video stream whose type is "white board" and display it instead of the video stream whose type is "Room" and causes that video stream to be displayed in display region 604 (FIG. 6B). In response to selection of "Two view mode" 616, the user interface generator obtains a video stream whose type is "Room" and display it in a large region of the display region 604 screen and also obtains a video stream whose type is "Whiteboard" and displays it in a smaller region of the display region 604 (FIG. 6C). The videos in the large region and the smaller region can be alternated with each other via the use of a switching button. When a selection an object from among a menu bar (participant region 606), the user interface generator obtains, based on a position in the screen that is selected, Display Name of an object and displays the video stream associated with the identified Display Name. If a user operation performed during "two view mode", the video stream is displayed in the smaller region (FIG. 6D).

Figure 7:
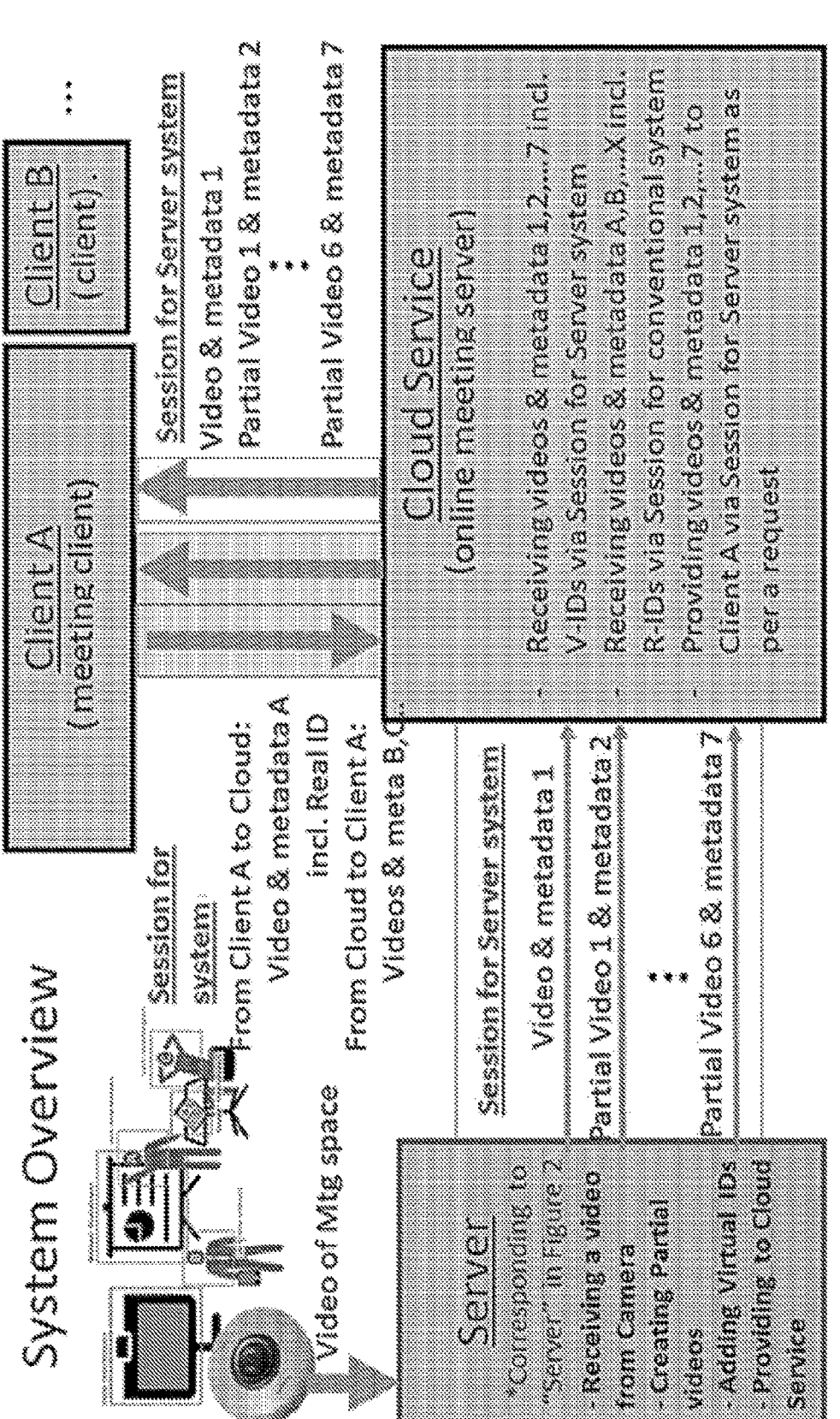
FIG. 7 an illustrative view of the online meeting solution according to the present disclosure.

According to the present disclosure, as shown in FIG. 7, online cloud meeting systems do not receive and process any videos without a participant ID. Accordingly, the server according the present disclosure provides a function that adds Participant IDs to any video source that does not have a Participant ID such that the online meeting system can process videos that traditionally do not include Participant IDs. The server adds unique Virtual IDs to one or more video streams cropped from the video captured at the location. It should be understood that these partial streams extracted via a cropping process are identified both as virtual video data stream and video data streams and thus these terms are interchangeably used through the present disclosure and should be understood to mean the same thing. These partial video streams are able to be recognized by the online meeting system as videos for an online meeting. The online meeting system uses IDs to recognize the received videos as being related to, or otherwise associated with a particular online meeting system to identify each individual video. As such these partial video streams are individual video data streams that are "virtual video data streams". When the online meeting system transmits the video data streams, it uses IDs and a Session ID that is from the client to identify videos to be sent to client devices. When the client receives the video data streams, the client uses the IDs to recognize that the received videos are related to particular online meeting and to identify each individual video.

According to an exemplary operation, a client device associates a participant ID with a respective one of the videos obtained by a camera (either in room or at the remote computing device), and sends them to Cloud Service 230. The Server 200 associates a virtual participant ID with each video obtained by network camera(s) of a meeting room, and send them to Cloud Service. The network camera(s) is not associated with a specific user. The online meeting system sends Video(s) and Participant ID(s) to Client in response to a request from the Client.

According to a start request for videos associated with Virtual Participant IDs from Client, Cloud Service (e.g. online meeting system) starts to send videos associated with virtual participant IDs to the Client which sends the request. Cloud Service sends, via a conventional meeting session, videos associated with Real Participant IDs, and sends, via another separate session (e.g. a server-specific session), videos associated with Virtual Participant IDs. The session ID of Server session is created at the time when Client issues the start request.

Client displays, within a first window for a conventional meeting, videos received from Cloud Service via Conventional meeting session and associated with Real Participant IDs. Client displays, within a second window, videos received from Cloud Service via Server session and associated with Virtual Participant IDs. Client does not distinguish Real Participant ID from Virtual participant ID. Client distinguishes a video of an Server system and a conventional meeting system by checking a session ID used to send the video. In another embodiment, all videos may be displayed within a single window.

In a further embodiment, the server also includes a dedicated display screen that can display, for the users at the predetermined location (e.g. office meeting room) video streams associated with the crop sections of the video captured by the image capture device at that location. In other embodiment, the display screen is a touch screen and allows for selectability of particular objects captured by the image capture device.

In another embodiment, the system may make use of metadata such as security level information that is used to determine, based on user level information for each Real Participant ID, if each corresponding vide can be transmitted to the client who requests that video. In a further embodiment, real participants at the location can set restrictions or preferences that would inhibit the server from providing video of themselves or an object of theirs to the client device. In this manner, the system can prevent the generation of Virtual IDs for one or more objects detected based on preferences of the a user.

Figure 8:
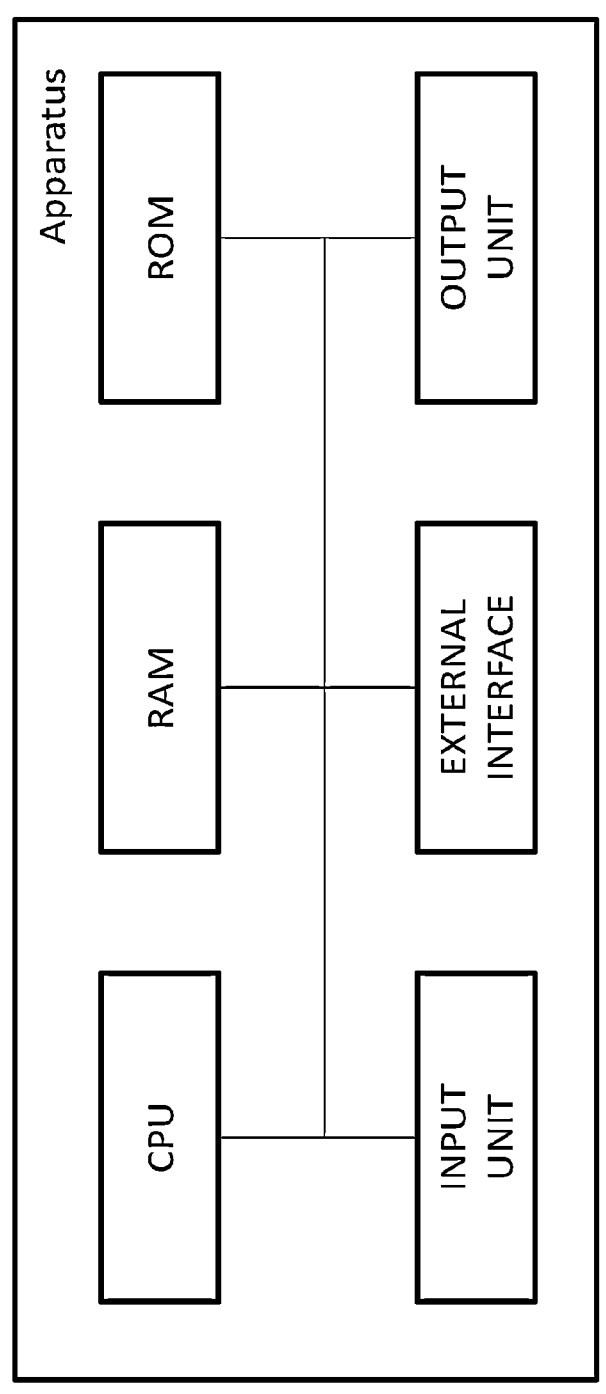
FIG. 8 is a block diagram detailing the hardware components of an apparatus that executes the algorithm according to the present disclosure.

FIG. 8 illustrates the hardware that represents any of the server, the cloud service and/or client device that can be used in implementing the above described disclosure. The apparatus includes a CPU, a RAM, a ROM, an input unit, an external interface, and an output unit. The CPU controls the apparatus by using a computer program (one or more series of stored instructions executable by the CPU) and data stored in the RAM or ROM. Here, the apparatus may include one or more dedicated hardware or a graphics processing unit (GPU), which is different from the CPU, and the GPU or the dedicated hardware may perform a part of the processes by the CPU. As an example of the dedicated hardware, there are an application specific integrated circuit (ASIC), a field-programmable gate array (FPGA), and a digital signal processor (DSP), and the like. The RAM 306 temporarily stores the computer program or data read from the ROM, data supplied from outside via the external interface, and the like. The ROM stores the computer program and data which do not need to be modified and which can control the base operation of the apparatus. The input unit is composed of, for example, a joystick, a jog dial, a touch panel, a keyboard, a mouse, or the like, and receives user's operation, and inputs various instructions to the CPU. The external interface communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit is composed of, for example, a display unit such as a display and a sound output unit such as a speaker, and displays a graphical user interface (GUI) and outputs a guiding sound so that the user can operate the apparatus as needed.

The scope of the present disclosure includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A server for a remote meeting conducted between a plurality of clients connected via a network, the server comprising:

one or more processors; and one or more memories storing instructions that, when executed, configures the one or more processors, to:

obtain a video stream from a predetermined camera positioned to capture a field of view at a physical location;

specify, from the obtained video stream, one or more partial video streams representing objects from with the obtained video;

store, in the one more memories, each of the obtained video stream and the specified one or more partial video streams in association with respective virtual participant ID information, join each of the respective virtual participant ID information to a virtual meeting session, the virtual meeting session including a virtual meeting identifier which associated with an online meeting session which controls an online meeting between the server and one or more client devices located remotely from the physical location, wherein the virtual meeting session is different than the online meeting session; and transmit, to the one or more clients join to and participating in the online meeting session, a link to the virtual meeting identifier and the respective virtual participant ID information associated with the virtual meeting identifier, the line enabling access, by each of the respective client devices, to the respective associated virtual participant ID information for each of the one or more of the obtained video stream and the one or more partial video streams representing objects from within the obtained video stream to generate a display on a respective client device.

2. The server according to claim 1, wherein the predetermined camera is a network camera and the physical location is a meeting space.

3. The server according to claim 1, wherein the objects in the one or more partial video streams include at least one of a white board, a display screen and a document, and wherein the virtual participant ID information indicates information identifying the object.

4. The server according to claim 3, wherein the one or more processors are further configured to receive a video request for one or more of the obtained video streams and one or more of the partial video streams from the client, and transmit, to the client, the requested video stream using the respective virtual participant ID information in response to the video request.

5. The server according to claim 1, wherein the one or more processors are further configured to receive respective user video streams, generated by client devices at the physical location and associate respective virtual participant id information with each of the received user video streams; and join the respective virtual participant ID information associated with respective user video streams, to the virtual meeting session enabling, selection thereof by one or more of the client devices at the physical location and client devices located remotely from the physical location.

6. The server according to claim 1, wherein each of the plurality of clients using respective client devices includers user id information stored, in the one or more memories, in association with security level information, and the obtained video stream and the one or more partial video streams.

7. The server according to claim 6, wherein each virtual participant id information corresponding to each partial video stream is stored in the one or more memories in association with a security level information, and wherein a video stream of a partial region to be transmitted to the client is determined based on the security level information associated with the user id information of the client and the security level information associated with each of the virtual participant id information.

8. The server according to claim 1, wherein the obtained video stream and the one or more partial video streams are is transmitted to the client such that the video associated with different virtual participant ID information are displayed on a different window.

9. The server according to claim 3, wherein position information indicating a position of the partial video stream within the obtained video captured by the predetermined camera; is further transmitted to the client.

10. A client for a remote meeting conducted between a plurality of clients connected via a network, the client comprising:

one or more processors; and one or more memories storing instructions that, when executed, configures the one or more processors, to:

join an online meeting session between a plurality of devices;

receive, as part of joining the online meeting session, a link to a virtual meeting identifier of a virtual meeting session which is associated with, but different from, the online meeting session, the received virtual meeting identifier link having respective associated virtual participant ID information for an obtained video data stream and one or more partial video streams representing objects from within the obtained;

display, in a first window, the video of each client that has joined the online meeting session, and display, in a second window in response to a selection of a predetermined button in the first window that corresponds to one or more virtual participant ID information associated with the virtual meeting identifier, wherein the second window displays one or more video streams associated with the selected one or more virtual participant ID information are captured by a predetermined camera at a physical location.

11. The client according to claim 10, wherein the one or more processor are further configured to transmit, to a server that generates the virtual meeting session, meeting ID information in response to a selection of a participation button for the remote meeting, and in response to the selection of the predetermined button in the first window, transmit, to the server, a request for the virtual meeting session information associated with the meeting ID information and requesting one or more video streams captured by the predetermined camera and which are associated with respective virtual participant ID information, and wherein the second window displays the video received from the server after transmitting the request.

12. The client according to claim 10, wherein the second window is a window of a web browser.

13. The client according to claim 10, wherein the one or more processors are further configured to receive position information indicating a position of one or more second video stream the video captured by the predetermined camera.

14. The client according to claim 13, wherein the one or more processors are further configured to detect a designation, by a user, of the one or more second video streams whose position is indicated by the position information, wherein an enlarged video of the partial region is displayed in response to the detection of the designation of the partial region.

\* \* \* \* \*